Nov. 3, 1953   E. E. LITTLEFIELD   2,657,673
FLUID MOTOR CONTROL
Filed Nov. 4, 1944    4 Sheets-Sheet 1

INVENTOR.
Edgar E. Littlefield

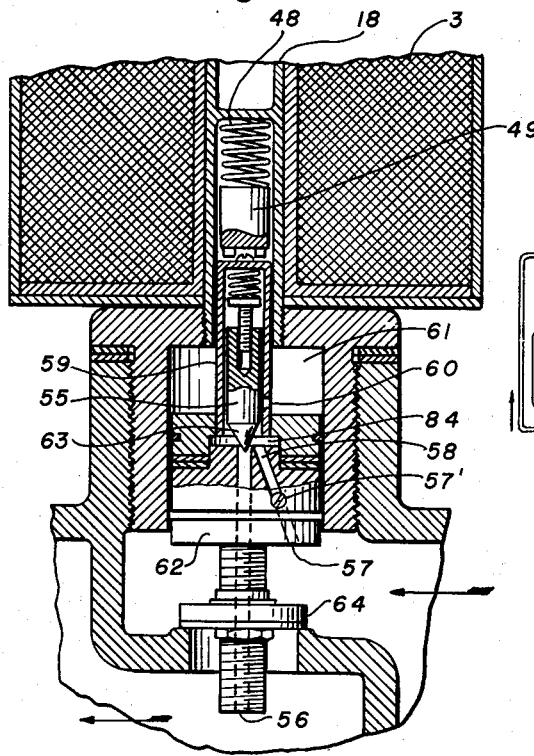
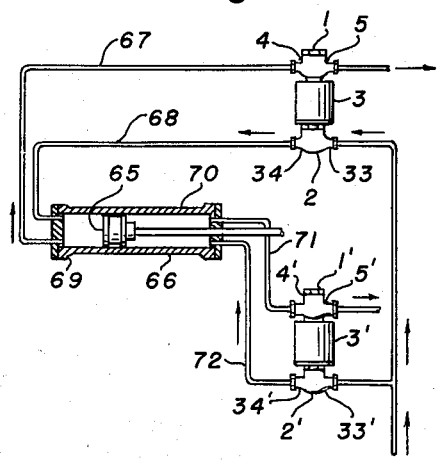
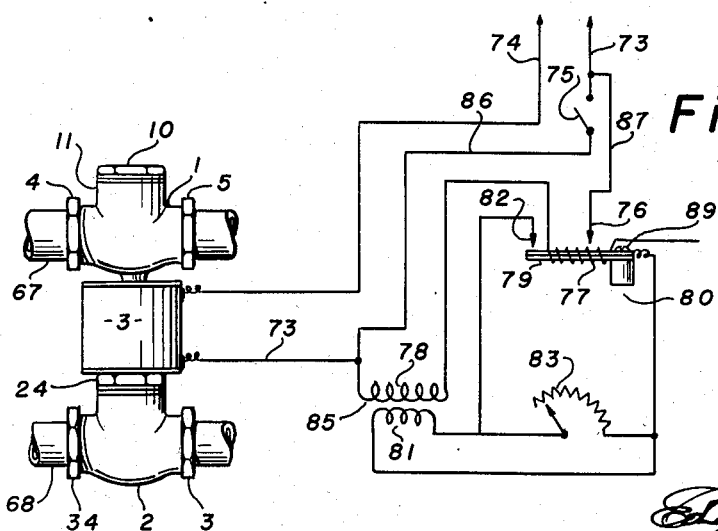
Fig. 4
Fig. 5
Fig. 6

Nov. 3, 1953 — E. E. LITTLEFIELD — 2,657,673
FLUID MOTOR CONTROL
Filed Nov. 4, 1944 — 4 Sheets-Sheet 4
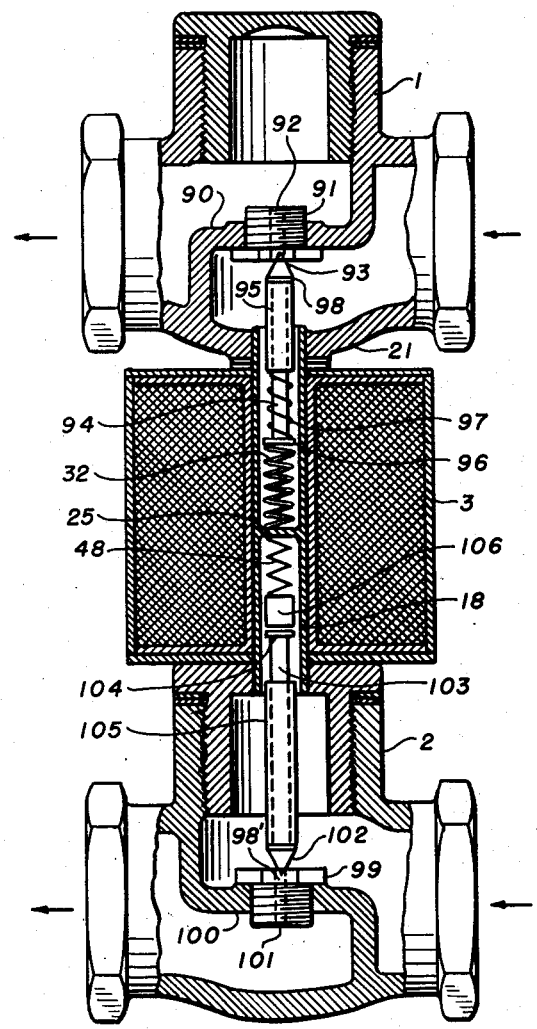
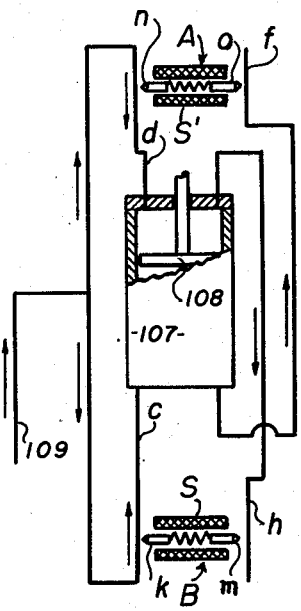
INVENTOR.
Edgar E. Littlefield Patented Nov. 3, 1953

2,657,673

UNITED STATES PATENT OFFICE 2,657,673

FLUID-MOTOR CONTROL

Edgar E. Littlefield, Los Angeles, Calif.

Application November 4, 1944, Serial No. 562,002

3 Claims. (Cl. 121—46.5)

This application contains subject matter common to my copending application Number 465,994, filed November 18, 1942, now Patent Number 2,496,553, and to that extent is a continuation-in-part of the earlier application.

The invention relates to improvements in valves and control systems, and has particular reference to fluid pressure operated valves and valve systems.

An object of the invention is to provide a common control for pressure-operated valves, as well as for valves of other types, controlling the supply and exhaust for a working piston.

The invention also relates to fluid pressure operated valves each having a pilot valve to control the operation thereof; and the invention has for an object to provide a common electrical control for operating the pilot valves, in such manner that one of the main valves may remain closed while the other thereof is open.

Another object of the invention is to employ the pilot valve principle for the double function of controlling the exhaust and the supply for the fluid pressure operated member of a power controlling cylinder.

Another object of the invention is to provide a compact unitary assembly of main supply and exhaust valves and common actuating means therefor.

Another object is to improve the construction and operation of fast opening valves, slow closing valves, fluid pressure operated valves and electrically operated or controlled valves of various types.

Other objects and many of the attendant advantages of this invention will be readily appreciated as the same becomes better understood by reference to the following detailed description when considered in connection with the accompanying drawings, wherein:

Fig. 4 is an enlarged vertical sectional view with parts broken away of a further modification of a main valve.

Fig. 5 is a schematical circuit diagram illustrating one manner of using the valve assembly of Fig. 1.

Fig. 6 is a schematical wiring diagram that may be employed in the control of translating devices, including such as those described herein.

Fig. 8 is a vertical view of a valve assembly, partly in section, of a further modification.

Fig. 9 is a control system employing features of the valves described herein.

Figure 1:
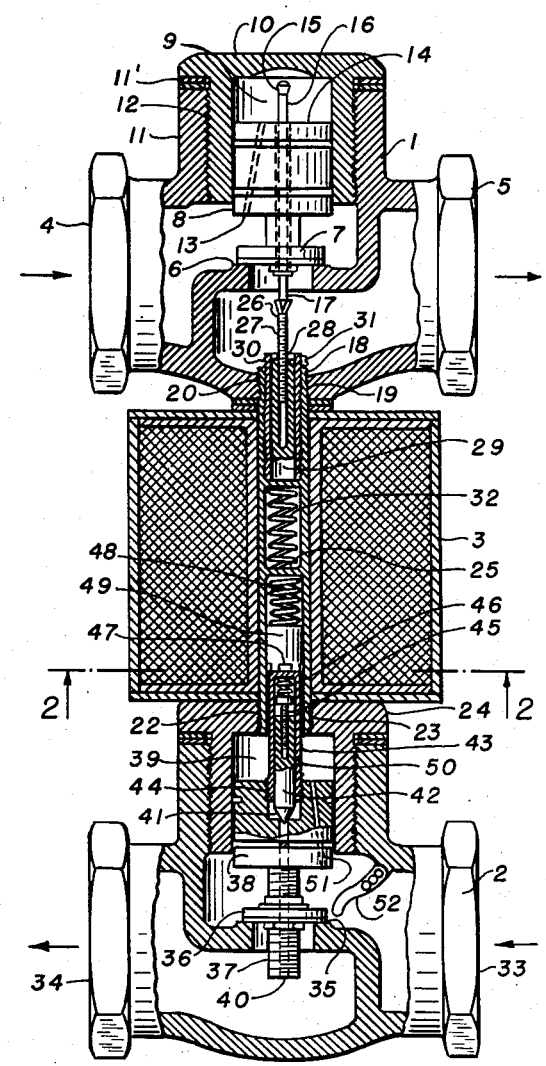
Fig. 1 is a vertical sectional view through a valve assembly according to the present invention.
Figure 2:
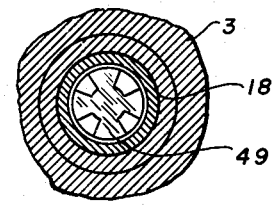
Fig. 2 is a sectional view on line 2—2 of Fig. 1 looking in the direction of the arrows.

Referring in detail to the drawings, Fig. 1 illustrates a main exhaust valve 1, a main supply valve 2, both of which are fluid pressure operated and which are assembled with a common electrical actuating member in the form of a solenoid 3. The valves 1 and 2 and solenoid 3 are preferably mounted together to form a unitary structure.

The exhaust valve 1 has an inlet 4 and an outlet 5 and therebetween a valve seat 6 having above it a valve head 7 which carries a piston 8 slidable in a chamber 9 in the cap 10 which is adjustably screw-threaded in the neck 11 as indicated at 12. The distance that cap 10 projects in neck 11 can be adjusted by means of washers 11', and similar adjustment is possible with all other valve caps shown. The piston 8 has a comparatively small inlet passage 13 extending therethrough to admit fluid under pressure from inlet 4 behind the piston 8 to seat the valve 1 at certain times. The piston 8 also has axially therethrough a comparatively large drain passage 14, the upper end of which forms a seat for the pilot valve 15 carried by a stem 16 which slides in the passage 14 and which extends below the bottom of the valve head 7 as indicated at 17.

The valves 1 and 2 are physically mounted together by a tube 18 of nonmagnetic material, the upper end of which is secured by screw threads 19 in an opening 20 in the bottom 21 of the casing of valve 1. The lower end of tube 18 is connected by screw threads 22 in an opening 23 in the cap 24 of valve 2. An intermediate portion of tube 18 is sealed off by a wall 25. The valve stem 16, for pilot valve 15, is actuated at times by a push rod 26 which is longitudinally adjustable by means of screw threads 27 in a threaded aperture 28 in an armature 29 of magnetic material. Armature 29 is in the form of an elongated cylindrical rod, and has a sliding fit in a tube 30 of nonmagnetic material which is screw threaded inside of tube 18. An annular flange or shoulder on the lower end of armature 29 contacts the lower end of tube 30 limiting the upward travel of the armature, which is urged upwardly by a compression spring 32. A set screw 31 placed in any desired position would serve the same purpose, and this could also be used for locking the armature against operation if for any reason it is desired to do so. Around the tube 18 and extending between the bottom 21 of valve 1 and the cap 24 of valve 2 is a solenoid 3. When solenoid 3 is energized, the armature 29 is moved towards the center of solenoid 3, against the action of spring 32, thereby retracting the push-rod 26 and allowing the valve stem 16 to descend and the valve 15 to close.

The supply valve 2 has an inlet 33, and an outlet 34 and therebetween a valve seat 35 for a main valve head 36 mounted on a screw-threaded stem 37 which has at its upper end a piston 38 slidable in the chamber 39 in the cap 24. The piston 38 has an axial drain passage 40 therethrough, the upper end 41 of which serves as a valve seat for the pilot valve 42 preferably of magnetizable material, such as stainless iron. The pilot valve 42 may be circular in cross section, or of any other suitable form, and is freely reciprocable in the casing 43, of non-magnetic material. Casing 43 is secured by screw threads 44 in a bore in the top of piston 38. The pilot valve 42 at its upper end is provided with an adjustable abutment in the form of a screw 45, preferably of magnetizable material, against which bears a compression spring 46, the upper end of which bears against the top of pilot valve casing 43. The top of casing 43 has a threaded breather hole 47, which may, if desired, be closed by a small screw. The casing 43 and the piston 38 and valve 36, all of which are arranged in operative relation, are urged in a downward direction by spring 48 between the underside of wall 25 and the top of a sliding armature 49 of magnetizable material, such as stainless iron, which rests on the top of casing 43, and which may, if desired, be provided with side openings at the bottom, for release of fluid. The side of casing 43 is provided with a port 50 so positioned that it will be uncovered when the valve 42 is raised against the action of spring 46, due to energization of solenoid 3. Adjustable mounting of casing 43 permits adjustments to be made in the position of the port 50. Piston 38 has an inlet passage 51 therethrough, somewhat smaller than drain 40, communicating with chamber 39. Port 50 may be of any desired dimensions and may, if desired, be employed to regulate flow of fluid from chamber 39. The space provided for piston 38 and valve head 36 may easily be such that a piston and valve arrangement, such as 8 and 7 of valve 1, may be substituted therefor, if desired. In such case valve means 53 of Fig. 3 will be found a satisfactory means for controlling drain passage 14.

When solenoid 3 is de-energized, or when the device is disconnected from the supply and exhaust lines, as is the case in Fig. 1, the various parts are in the position shown in this figure.

Assuming that the device is properly connected for use, solenoid 3, when energized, will cause the armature 29 and pilot valve 42 to move toward the center of solenoid 3. Movement of armature 29 downwardly retracts push-rod 26 and compresses spring 32 permitting pilot valve 15 to close, whereby the pressure admitted through inlet passage 13 builds up on top of piston 8, causing it to close valve 7, or holding it closed, if it is already in the position shown in Fig. 1. When pilot valve 42 moves upwardly it uncovers valve seat 41 and port 50, permitting the pressure on top of piston 38 to be relieved faster than it is built up through the inlet passage 51, whereby the pressure on the under side of piston 38 overpowers the pressure on the top thereof, and the valve 36 moves to open position.

De-energizing of the solenoid permits fluid pressure, admitted from inlet 33 through passage 51 to chamber 39, to accumulate above piston 38, thus closing valve 36. Pilot valve 15, of upper valve 1, has now assumed an open position under action of the compression spring 32. When fluid is exhausted from the cylinder under pressure, the pressure on the underside of piston 8 will be greater than on its top because pressure will escape through drain passage 14 faster than it is built up in chamber 9 through passage 13, hence the valve 7 under these conditions will open.

If desired, the inlet 33 may be provided with a pivoted impact device or knocker 52 actuated by inrush of fluid to strike the underside of piston 38 and help it to rise. This or any other suitable impact device may be employed in connection with any of my valves, when desired, to aid in unseating the same.

Figure 3:
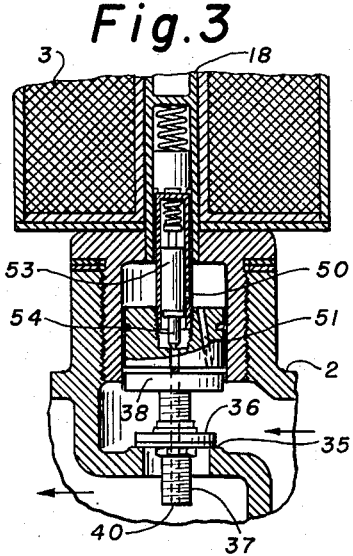
Fig. 3 is a vertical sectional view, with parts broken away, showing a modified form of pilot valve.

In the modification shown in Fig. 3 the pilot valve 53 is similar in construction to that shown in my Patent 1,633,217. The needle valve 54, having a reduced diameter, comes opposite the port 50 when the pilot valve is in raised position, increasing the effectiveness of the valve.

In the modification in Fig. 4, the pilot valve 55 controls not only the axial drain passage 56, as before, but also the inlet passage 57 because the discharge end 58 thereof, as well as passage 56, communicate with chamber 84, which is in communication with the interior of the pilot valve casing 59. The shank of valve 55, being of a diameter which almost fills the inside of casing 59, the flow of fluid through passage 57, when the valve is closed, is restricted between the side of valve 55 and the inside of casing 59 in seeking an outlet through port 60 to reach chamber 61 above piston 62. When pilot valve 55 is in its raised position, its conical valve head 63 is withdrawn to a position above or adjacent port 60, so that the former no longer restricts the discharge from chamber 61 through port 60 to drain passage 56. By thus controlling the fluid I provide the advantages of a quick opening and slow closing valve.

The flow through passage 57 may be adjusted by screw plug 57'. Similar regulating means may be used in connection with the other valves, if desired. Washers and a threaded connection between the upper and lower parts of piston 62 enable certain adjustments to be made when desirable. A threaded connection between the piston 62 and valve head 64 also makes certain adjustments possible, although the parts may be made integral if desired. An adjustable connection also permits the main valve to be locked in closed position when it is desired to employ the drain passage only for control of fluid, as may be the case in the control of a low pressure gas. Or a nut may be added to the threaded piston stem and tightened up on the port wall. A similar arrangement may be provided for the valve 1, if desired. By this I mean that if the member 16 is removed and the threaded end of piston 8 extended far enough below the port wall to permit a nut of the proper size to be threaded thereon the piston may be locked in closed position on its seat 6. The lower end of the threaded piston extension being flat, the lower end of the drain passage will form a suitable seat for any of the by-pass controlling members. For instance, the smaller end of the push rod 16 may extend upwardly into the piston, while the valve end 15 may be arranged to cooperate with the seat at the lower end of the by-pass 14. Several other arrangements suggest themselves. The needle valve of the member 42, for instance, may be arranged to cooperate with the lower end of by-pass 14 by substituting it for the member 29.

Compression springs may, when desirable, be inserted between the tops of any or all of the pistons and the upper walls of the bonnets for the purpose of urging the pistons to their seats.

In order to increase the effectiveness of the device and enlarge its scope of usefulness the parts in numerous cases are assembled in adjustable and/or interchangeable relation.

Fig. 5 illustrates a diagram of connections which may be employed for operating a piston 65 in a cylinder 66, although other connections may be used. As here illustrated, the inlet side 4 of exhaust valve 1 and the outlet side 34 of the inlet valve 2 are connected by pipes 67 and 68, respectively, to the same end 69 of the cylinder 66, while the other end 70 of cylinder 66 is connected by pipes 71 and 72 in a similar manner to the inlet side 4' of exhaust valve 1' and to the outlet side 34' of supply valve 2', respectively. With solenoid 3 de-energized, namely, with the parts in the position shown in Fig. 1, referring now to Fig. 5, the end 69 of cylinder 66 can exhaust through pipe 67 and exhaust valve 1, so that piston 65 is free to move to the left. If solenoid 3'' is now energized, the exhaust valve 1' is closed and the supply valve 2' is opened, thereby admitting pressure to the right side of piston 65 to urge it to the left. Piston 65 can, of course, be moved to the right by energizing solenoid 3 while leaving solenoid 3' de-energized.

A circuit arrangement which may be used for solenoid 3 is indicated in Fig. 6 wherein lines 73 and 74 lead to a suitable power supply. One side 74 is connected directly to solenoid 3, while the other side 73 is divided into branches 86 and 87. The branch 86 is connected through the switch 75 to the other end of 73 adjacent where it enters the solenoid; the other branch 87 is connected to an adjustable contact 76 of a resistance coil 77, co-acting with a bimetallic element 79 of the thermo-relay device 80, thence through the primary 78 of a step-down transformer or impedance 85, beyond which it joins the line 73 leading to solenoid 3. If switch 75 is momentarily closed, with thermostat 79 in the position shown in Fig. 6, a comparatively large starting current is supplied to solenoid 3, through lines 74, 73 and branches 86 and 87. Since branch 87 is normally in closed circuit relation with the current supply, the current will continue to flow through transformer winding 78 after switch 75 is opened, subject to control by secondary circuit 81, which includes a normally closed circuit controlling element 82, for the bi-metallic element 79. The secondary circuit 81 also includes an adjustable resistance or rheostat 83 by means of which the proper current may be provided for holding the armatures, such as 29, 42, 49 and 55 in their operated position, less current being required to hold the armatures in this position than is required to move them to this position. The contact 82 may be of the adjustable screw type. By reversing the bi-metallic element on the screw connection 89, or by otherwise employing an element that closes the circuit when heat is applied, the element may be employed for delaying the closing of a valve, or for continuing the operation of any other device connected for operation in a similar manner, for a predetermined time. In this case the contact would be normally open, but when switch 75 is closed the heat developed in the bi-metallic strip 79 will cause it to close the circuit and thus hold the valve open until contact 82 opens, when the temperature of the bi-metallic member has dropped sufficiently.

In the first case above, i. e., when the contact 82 is normally closed, the circuit will open after a certain temperature rise in the bi-metallic element, thus preventing overheating of the device, such as solenoid 3. The bi-metallic strip may be provided with a longitudinal slot for adjustable connection with screw connection 89 if desired.

By the above means, either separately or together, as may be, the opening or closing of contact 82 may be controlled according to a predetermined time limit. The adjustable contact 76 provides for control of the heat applied to the bi-metallic member 79. The adjustable resistance or rheostat 83 may be employed either to limit the amount of current flowing in the primary 78 or to open the secondary circuit, as desired.

The above methods of control may be employed in the control of many different types of translating devices besides those indicated.

Obviously, the fluid control means I have provided may be used in connection with hydraulic control systems.

Detachably assembling the valves, as in Fig. 1, permits separation and independent employment of the same for controlling such fluids as water, refrigerants, gas, air, oil, etc.

Where the fluid to be controlled is of insufficient pressure to lift the main valve after the pilot valve is unseated, as would probably obtain in some cases, the drain passage alone may be used and made sufficiently large to meet the requirements of any particular case. Of course, the drain passages of any of the valves may be of any capacity requisite for any particular purpose.

The valve 1, shown in the upper part of Fig. 1, may easily be of a type wherein a larger drain passage is controlled by a plurality of auxiliary valves such as are shown in my Patent 2,070,607, in which case the enlarged fluted upper end of the push rod 26 may be omitted, permitting the same to telescope into the drain passage of the main valve. The guide 37, shown in the patent, may, if desired, be employed to cause an unseating of the smaller valve first.

Similar reference characters refer to similar parts.

Figure 7:
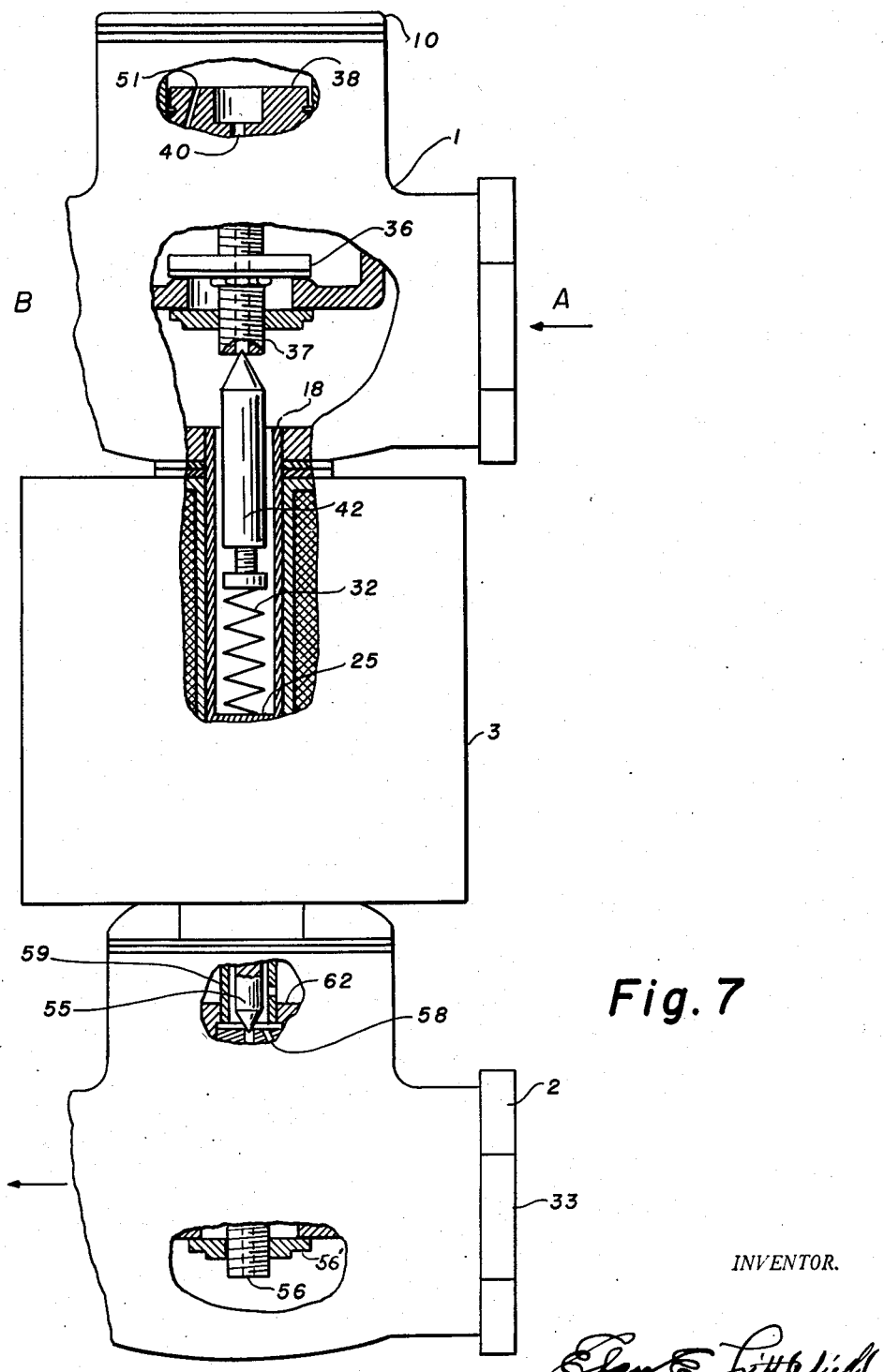
Fig. 7 is a vertical view of a valve assembly, with parts broken away, showing the main valves in locked position, the flow of fluid being controlled by means of the valves controlling the passages through the main valves.

In Fig. 7 I show a convenient arrangement, heretofore referred to, wherein the main valves may be locked in closed position, as by the nuts indicated in the drawing, and the flow of fluid controlled by the auxiliary valves. While other elements found in the drawings may be arrranged to accomplish a similar purpose, in Fig. 7 I have employed the structure shown in Fig. 4 for the lower valve, while in the upper casing I have substituted the piston 38 for piston 8, since the former is already provided with a threaded extension, to which a nut may be threaded and tightened up on the port wall, as shown. It has previously been mentioned, however, that, if desired, the threaded end of piston 8 may be extended to a point below the port wall for the purpose of adding a nut thereto. Except for the nut that is added, the lower valve is substantially a counterpart of the valve of Fig. 4. The needle valve of the upper combination may be any of those shown, such as either 55 or 42. As shown, it is inverted, so that the needle valve end may co-operate with the seat formed by the lower end of the by-pass 40. In like manner, any suitable one of the compression springs shown, such as 32, may be employed to cause the needle valve to seat when solenoid 3 is de-energized. Tube 30 has been omitted, but it may be added, if desired. In the upper arrangement the flow of fluid is preferably from A to B, while in the lower valve it is in the direction of the arrow. Other connections may, however, be made. According to the present showing, when solenoid 3 is energized, needle valves 55, preferably made of stainless iron or its equivalent, are retracted toward the wall 25, permitting fluid to flow through passages 40 and 56. I have previously stated that the drain passages may be of any required size. When solenoid 3 is de-energized, the co-operating compression springs urge the valves to their seats. Removal of nut 56', engaging the lower end of duct member 56, would form a combination in which the operation of the upper valve member would be dependent entirely upon electrical energy while the lower main valve would be fluid-operated and pilot-controlled.

In the modification shown in Fig. 8 I have, for illustrative purposes, and as a matter of convenience, shown the details of construction as housed in the framework of the arrangement shown in Fig. 1, certain elements shown in that figure having obviously been omitted in order to show the modified arrangement. In the port wall 90 I have screw threaded a plug 91 having a passage 92 therethrough, the lower end of which forms a seat for a needle valve 93. Slidable on the non-magnetic stem 94 of the needle valve is a magnetizable sleeve 95 constituting an armature. The lower end of the member 94 is provided with a cap 96 and between this cap and the lower end of sleeve 95 a compression spring 97 acts to urge the sleeve to assume a position against the shoulder 98 of the needle valve 93. The needle valve itself is urged to a seated position by the compression spring 32 mounted between the wall 25 and the cap or head 96 of the needle valve stem. The sleeve 95 is preferably made of stainless iron or its equivalent. The pointed end of the needle valve may, if desired, be made of stainless iron and mounted on the non-magnetic stem 94 in any convenient manner. The cap or head 96, also, may, if desired, be made of stainless iron and mounted on the stem 94 in any convenient manner.

The lower valve housing 2 is provided with a plug 99, similar to the one of the upper valve, screw threaded into the port wall 100. Like the former, this plug is also provided with a passage 101. The upper end of this passage forms a seat for a needle valve 102 having a non-magnetizable stem 103 provided with a cap or head 104. Slidable on the stem 103 is an armature 105 preferably made of stainless iron or its equivalent. If desired, a compression spring, such as 97, may be interposed between the sleeve 105 and the cap or head 104. The stem 103, together with the cap 104 and needle valve end, may be made of brass or similar material, or the cap and/or valve end made of stainless iron, or its equivalent, all as desired, to meet the requirements of any particular purpose. Between the wall 25 and the upper end of the valve stem is inserted a compression spring, such as 48, the lower end of which rests on a magnetizable plug 106 which, in turn, rests on the top of cap 104. In certain cases the use of this plug 106 would be optional. The plugs 91 and 99 may be identical in every respect and may, on occasions, and, if desired, be provided with fluid flow regulating means, such as 57', Fig. 4, so that the flow through either or both of the passages through the plugs may be regulated. In this connection it may be desirable to have the exhaust passage, assuming for example that the valve's connection is to a power cylinder, of greater capacity than the one handling the supply. I contemplate, that the valve assemblies in both the upper and lower chambers, i. e., the chambers above and below the wall 25, may be identical in every respect, or interchangeable, one for the other. For instance, the valve 93 and its co-operating parts may be substituted for the valve 102 and its co-operating parts or vice versa. Such an arrangement enables the units to be made in pairs, thus, in many cases, reducing manufacturing costs.

When solenoid 3 is energized the valves 93 and 102 are unseated and retracted toward the wall 25, permitting fluid to flow through the discharge passages 92 and 101, of the plugs 91 and 99. Upon de-energizing solenoid 3 the valves again assume a closed position, as indicated in the drawing.

In Fig. 9 I have shown a diagram of connections in which two valves of the above type, or similar (shown in conventional form), are connected to control the supply and exhaust for a power cylinder 107, having a piston 108, which may be connected in any convenient manner for operating any suitable mechanism. Supply pipes c and d connect the cylinder at each end with a source of fluid under pressure 109. Exhaust pipes f and h connected to the cylinder, as shown, permit fluid at times to exhaust from the cylinder. The valve assembly B, as shown, is connected so that its valve member k may control the supply of fluid to the cylinder, at one end, and the valve member m connected so that it may control the exhaust from the opposite end of the cylinder. The valve assembly A is connected in a similar manner to the left end of the cylinder, or so that its valve member n may control the supply of fluid to the left end of the cylinder and the valve member O so that it may control the exhaust from the right end of the cylinder. If solenoid S is now energized, fluid under pressure will enter the cylinder through branch pipe c, causing piston 108 to move to the left, tending to force fluid from the cylinder through exhaust pipe h. Since the energization of solenoid S has unseated both valve members m and k fluid will exhaust from the cylinder as indicated. If solenoid S is now de-energized and solenoid S' energized fluid under pressure will enter the cylinder through branch pipe d, causing the piston 108 to move to the right, tending to force fluid from the cylinder at the opposite, or right end, and since the energization of this solenoid has also unseated valve member O, fluid will exhaust through the latter.

It is apparent that any or all of the improvements herein disclosed for one of the valves may be employed in the others. Also, that the main valves may be used separately or in various combinations and in many ways other than as herein illustrated. Also, that spring or gravity means may sometimes be used in returning the piston to the position previously occupied.

Re-arrangements in the elements shown and described may be made for carrying out any particular or desired purpose.

A combination may be made up of a fluid operated valve, for instance, and one not fluid operated. For example, by removing the plug 99, Fig. 8, and the needle valve arrangement 105, the fluid operated valve assembly of either 64, Fig. 4, or 36, Fig. 1, may be substituted therefor. Or any other desired arrangement to effect the purpose may be employed.

For the sake of clearness and brevity I have illustrated only a few simple embodiments of my invention and the several features thereof, and have described them with particularity; but it will of course be understood that my invention is not limited to the forms thus illustrated, as I intend to cover all forms, methods, and arrangements that come within the definitions of my invention as set forth in the appended claims.

I claim:

1. In combination; a cylinder having a piston reciprocable therein; a valve assembly having two valve seats, two valves only, and common electrical controlling means therefor said means acting upon said valves to move the same relative to the said seats and relative to each other thereby controlling a supply of pressure fluid to the cylinder to cause the piston to move in one direction and controlling exhaust of fluid from the cylinder in response to movement of the piston; a second valve assembly having two valve seats, two valves only, and common electrical controlling means therefor said means acting upon said valves to move the same relative to the said seats and relative to each other thereby controlling a supply of pressure fluid to the cylinder to cause the piston to move in an opposite direction and controlling exhaust of fluid from the cylinder in response to movement of the piston.

2. The combination with a piston, and housing means therefor, of a source of operating fluid; a pair of valves, one of which controls the admission of operating fluid to one side of the piston and the second of which controls exhaust of fluid from the path assumed by the piston, due to pressure of operating fluid; a second pair of valves, one of which controls admission of operating fluid to another side of the piston and the second of which controls exhaust of fluid from the path assumed by the piston, due to the pressure of operating fluid; and common electrical means for the valves of each of said pairs of valves for causing the said valves of each pair to move along a common axis toward and away from each other to seat and unseat.

3. The combination with a piston, and housing means therefor, of a source of operating fluid; a pair of valves, one of which cooperates with said source to control the flow of said fluid, which assume unseated positions when they are moved toward a common point substantially within their paths thereby to drive said piston in one direction; a second pair of valves which assume unseated positions when they are moved toward a common point substantially within their paths thereby to drive said piston in another direction; and common electrical controlling means for each pair of valves to control the movement of the valves of each pair toward and away from their said common point.

EDGAR E. LITTLEFIELD.

References Cited in the file of this patent

UNITED STATES PATENTS

| Number | Name | Date |
|---|---|---|
| 294,669 | Pope | Mar. 4, 1884 |
| 410,181 | Ongley | Sept. 3, 1889 |
| 483,458 | Lefebvre | Sept. 27, 1892 |
| 604,358 | Alexander | May 24, 1898 |
| 685,662 | Anawalt | Oct. 29, 1901 |
| 701,509 | Rylands | June 3, 1902 |
| 1,083,810 | Engberg | Jan. 6, 1914 |
| 1,284,197 | Larner | Nov. 5, 1918 |
| 1,301,757 | Steffes | Apr. 22, 1919 |
| 1,470,381 | Lamb | Oct. 9, 1923 |
| 1,515,673 | Geissinger | Nov. 18, 1924 |
| 2,096,763 | Ray | Oct. 26, 1937 |
| 2,221,365 | Ware | Nov. 12, 1940 |
| 2,251,441 | Dillman | Aug. 5, 1941 |
| 2,322,911 | Beam | June 29, 1943 |
| 2,343,806 | Scofield | Mar. 7, 1944 |
| 2,387,896 | Giger | Oct. 30, 1945 |
| 2,390,425 | Crum | Dec. 4, 1945 |
| 2,496,553 | Littlefield | Feb. 7, 1950 |